United States Patent [19]
Loewe

[11] 3,759,615
[45] Sept. 18, 1973

[54] METHOD AND APPARATUS FOR ELECTROOPTICAL MEASUREMENT OF THE DISTANCE FROM LIGHT-REFLECTING OBJECTS

[75] Inventor: Richard Loewe, Stuttgart-Feuerbach, Germany

[73] Assignee: Robert Bosch Photokino GmbH, Stuttgart-Unterturkheim, Germany

[22] Filed: July 6, 1970

[21] Appl. No.: 52,648

[30] Foreign Application Priority Data
July 5, 1969 Germany.................. P 19 34 186.7

[52] U.S. Cl...................... 356/4, 356/163, 250/204, 95/44 C
[51] Int. Cl.............................................. G01c 3/08
[58] Field of Search........................... 356/4, 5, 163; 250/204; 95/44 C

[56] References Cited
UNITED STATES PATENTS
3,054,898   9/1962   Westover et al........................ 356/4
3,207,904   9/1965   Heinz.............................. 250/204 X
3,333,105   7/1967   Kossakowski et al.................. 356/4
3,529,528   9/1970   Leitz....................................... 356/4

*Primary Examiner*—Benjamin A. Borchelt
*Assistant Examiner*—S. C. Buczinski
*Attorney*—Michael S. Striker

[57] ABSTRACT

A photoelectric range finder wherein the differential circuit contains four photoelectric receivers connected in twos in two branches of the circuit. Each receiver of one branch is paired with a receiver of the other branch and the two pairs of receivers are mirror symmetrical to each other. Each of two mirror symmetrical beams of light which is reflected by the selected portion of an object is directed against one of the two pairs of receivers. The circuit is balanced when exactly one-half of each beam impinges upon each of the respective pair of receivers regardless of eventual lack of uniformity of light intensity in various parts of the light beams. The circuit can be used to adjust the position of an objective in a camera or projector.

10 Claims, 3 Drawing Figures

PATENTED SEP 18 1973

3,759,615

INVENTOR
Richard LOEWE
By
Michael S. Striker
his ATTORNEY

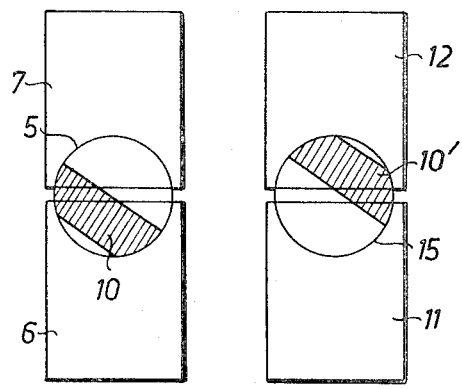
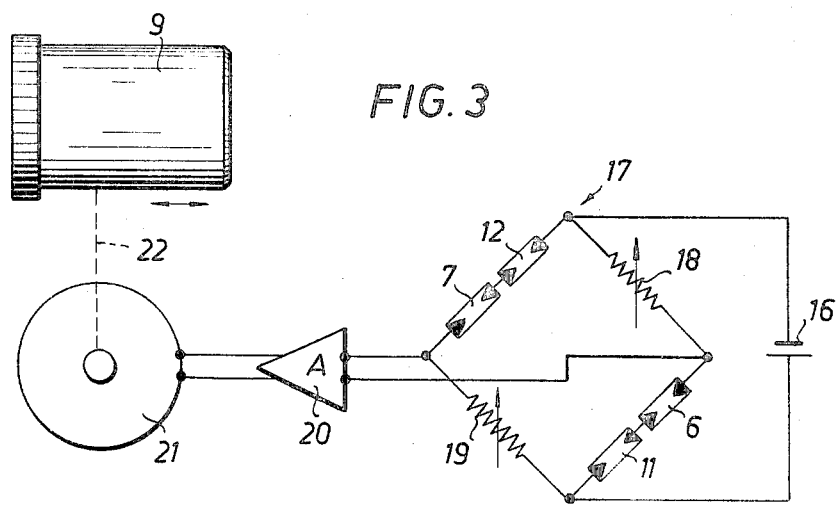

METHOD AND APPARATUS FOR ELECTROOPTICAL MEASUREMENT OF THE DISTANCE FROM LIGHT-REFLECTING OBJECTS

BACKGROUND OF THE INVENTION

The present invention relates to improvements in a method and apparatus for determining the distance between an object and a given point, for example, a point of the film plane in a photographic or cinematographic apparatus. More particularly, the invention relates to improvements in range finders and in methods of accurately determining the distance from an object, such as an object to be photographed or a photographic slide or film whose image or images are to be reproduced on a screen or the like.

Electrooptical range finders employ photoelectric receivers which evaluate the light reflected from an object for the purpose of determining the distance from the point of reflection. Such range finders are employed in photographic and cinematographic picture taking and reproducing apparatus to facilitate or to effect accurate focussing as a function of the distance from the object as well as to automatically adjust the focussing means. For example, it is known to employ a photoelectric receiver (which normally comprises two cells connected in a differential radiant energy sensing circuit) as a means for controlling the operation of a reversible electric motor which moves the objective, the film gate or the slide guide, together with the photoelectric receiver, in the direction of the optical axis. The motor is arrested at the exact moment when the two cells of the photoelectric receiver are exposed to radiant energy of identical intensity. Such adjustment is truly indicative of the exact distance from the object only in the event that exactly one-half of radiant energy which is reflected on the object impinges on each of the two cells in the receiver. This, of course, will happen only if each portion of the object from which the radiant energy is reflected against the cells exhibits the same reflectivity or if the reflectivity of any such portion of the object does not deviate excessively from the reflectivity of other portions. Otherwise stated, the adjustment is accurate only if the intensity of each part of reflected light is at least nearly identical.

The just-discussed conditions are met very infrequently or not at all. As a rule, the object whose distance is to be determined reflects light at a non-uniform rate. Consequently, when one cell of the photoelectric receiver is exposed to light which is reflected on a strongly reflecting part of the object while the other cell receives light which is reflected on a less reflecting part of the same object, the adjustments carried out by the motor are inaccurate because the receiver will tend to operate the motor until each of its cells receives the same amount of radiant energy. Such position of the receiver is not truly representative of the distance from the object. Consequently, the focussing is inaccurate and the exposure or the reproduced image is unsatisfactory.

SUMMARY OF THE INVENTION

An object of the invention is to provide a novel and improved method of electrooptically determining the distance from an object in such a way that differences in reflectivity of the object cannot affect the accuracy of measurement.

Another object of the invention is to provide a method which can be employed to insure accurate automatic focussing in picture taking or in reproduction of images.

A further object of the invention is to provide a novel and improved range finder for the practice of the above method.

An additional object of the invention is to provide an automatic focussing photographic or cinematographic apparatus embodying the improved range finder.

The method of the present invention is employed to compensate for uneven distribution of light intensity in a selected portion of an object in electrooptical measurement of the distance between such selected portion and a given point. The method comprises the steps of intercepting a first beam of radiant energy which is reflected on the selected portion of the object, intercepting a second beam of radiant energy which is also reflected on the selected portion of the object and is a mirror image of the first beam, and simultaneously evaluating both such beams for electrooptical measurement of the distance between the selected portion of the object and the given point. The evaluating step preferably comprises directing the first beam against at least one first photoelectric receiver and directing the second beam against at least one second photoelectric receiver which is in a differential circuit with the first receiver.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 illustrates the receivers of the measuring apparatus in positions they assume when the apparatus indicates the exact distance from a selected portion of an object; and FIG. 3 is a diagrammatic view of the differential circuit of the apparatus and of a reversible motor which adjusts an objective in response to signals from the circuit.

DESCRIPTION OF THE PREFERRED EMBODIMENTS

Figure 1:
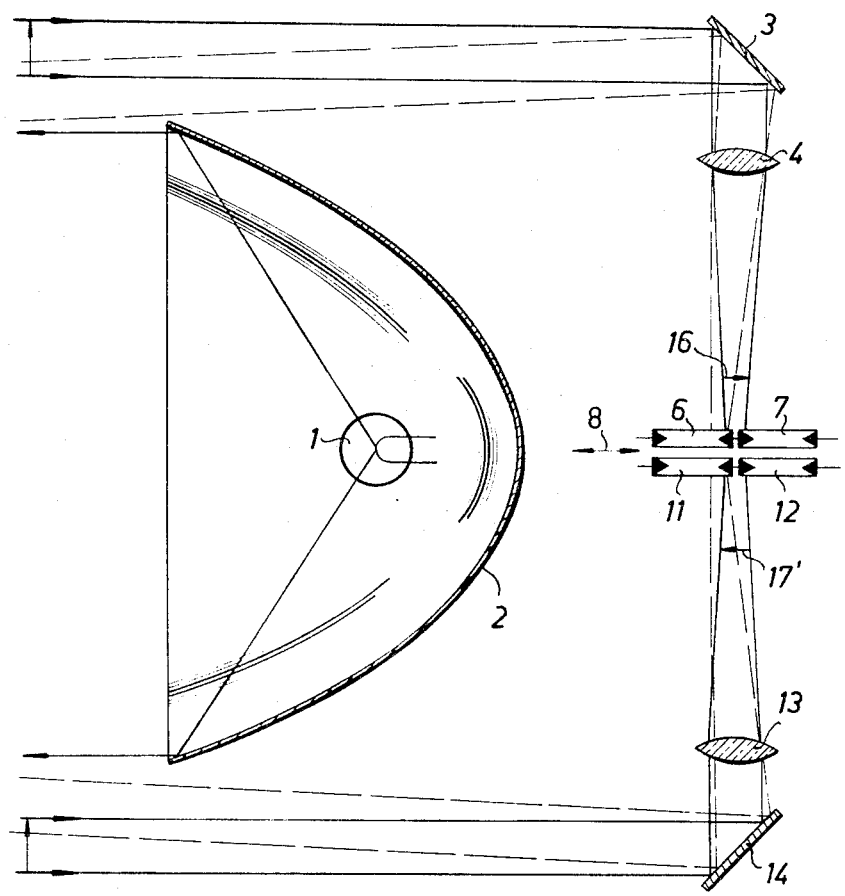
FIG. 1 is a diagrammatic view of certain parts of an electrooptical distance measuring apparatus which embodies the invention.

Referring first to FIG. 1, there is shown a source 1 of radiant energy which cooperates with a reflector 2 to direct a beam of radiant energy against an object, not shown. The light emitted by the optical sender 1, 2 is concentrated to such an extent that the beam impinges only on one or more selected portions of the object whose distance from the range finder requires determination. Thus, the range finder will determine the distance from that selected portion of the object which reflects the light beam emitted by the source 1. The light emitted by this source preferably belongs to the longer-wave portion of the infrared range to avoid interference with the measurement by the visible part of the spectrum.

A first beam of light which is reflected on the object impinges upon an intercepting mirror 3 which directs the thus-reflected light beam against a single lens 4 forming part of the optical imaging means. The lens 4 focusses the image of the selected light-reflecting portion of the object in the form of a disk-shaped light spot 5(FIG. 2) on a photoelectric receiver unit of the range finder. This receiver unit comprises two closely adjacent photoelectric cells 6,7 connected in a signal generating differential circuit 17 which is shown in FIG. 3. The cells produce identical output currents when exposed to radiant energy of identical intensity. At the present time, I prefer to employ cells 6,7 which constitute photoresistors sensitive to infrared light.

The cells 6,7 are movable in directions indicated by the double-headed arrow 8 and are coupled with the objective 9 (FIG. 3) of a camera or projector in such a way that each position of the objective corresponds to a different position of the cells. If the object is located at a substantial distance from the range finder (e.g., from a camera which embodies the range finder), the intercepting mirror 3 reflects a light beam which is indicated in FIG. 1 by solid lines. Upon completion of the adjustment of the objective 9, the cells 6,7 assume the positions shown in FIG. 1 in which exactly one-half of the speck 5 impinges on the cell 6 and the other half impinges on the cell 7. This is the infinity position of the object.

If the object moves closer to the range finder or vice versa, the angle of incidence of the reflected light beam changes as shown in FIG. 1 by broken lines. The speck 5 travels and impinges on the cell 6 or illuminates this cell to an extent which is greater than that of illumination of the cell 7. The circuit 17 produces a signal which brings about a change in the position of the objective 9 and of the cells 6,7. The adjustment is terminated when the speck 5 is again divided between the cells 6 and 7. The extent of such adjustment is indicative of the change in distance between the object and the range finder.

As a rule, the selected light-reflecting portion of the object includes portions of different reflectivity, e.g., lighter and darker portions which produce in the speck 5 regions of greater and lesser intensity. In the absence of a remedial action, such differences in intensity of various regions of the speck 5 would invariably cause inaccuracies in the adjustment of the objective 9. As shown in FIG. 2, the speck 5 includes a strip or band-shaped region 10 of lesser intensity. This can be caused by a dark spot on the lower part of the light-reflecting portion of the object. As further shown in FIG. 2, at least the major part of the region 10 is directed against the cell 6. In their effort to equally divide the amounts of reflected radiant energy, the cells 6,7 tend to assume positions in which a major part of the speck 5 is directed against the cell 6 and only the remaining minor part against the cell 7. This is due to existence of the region 10 which impinges mainly on the cell 6. If the cells 6,7 were permitted to assume such positions, the axial position of the objective 9 would not be truly representative of the distance from the object. In fact, the position of the objective 9 could deviate substantially from the position which is truly indicative of the actual distance from the object.

In accordance with a feature of the invention, the range finder embodies a compensating unit including a second pair of photoelectric cells 11,12 which are also connected in the differential circuit 17 of the cells 6,7, and second intercepting means for directing light reflected by the aforementioned selected portion of the object against the cells 11,12. The light intercepting means for the cells 11,12 is preferably analogous to or identical with the light intercepting means for the cells 6,7. In the embodiment of FIG. 1, such light intercepting means comprises a mirror 14 and a single lens 13 which focusses a light beam reflected by the mirror 14 against the cells 11 and 12. The speck which impinges on the cells 11,12 is denoted by the character 15 and is shown in the right-hand portion of FIG. 2. The speck 15 also includes a region 10' of lesser intensity which, however, impinges mainly on the upper cell 12. The optical characteristics of the lens 4 are identical with those of the lens 13 and the mirror 3 is symmetrical to the mirror 14 with reference to a plane including the optical axis of the objective 9. Furthermore, the distance between the lens 4 and cells 6,7 is identical with the distance between the lens 13 and cells 11,12, i.e., the size of the speck 5 is the same as that of the speck 15.

The plane of symmetry for the parts 3,4,6,7 on the one hand and the parts 14,13,11,12 on the other hand lies between the cells 6,7 and 11,12 of FIG. 1. As stated before, this symmetry plane includes the axis of the objective 9.

The arrows 16,17' of FIG. 1 indicate that the speck 5 which impinges on the cells 6,7 is a mirror image of the speck 15 which impinges on the cells 11,12. This is further shown in FIG. 2. Consequently, the differences in intensity of those portions of the speck 5 which respectively impinge on the cells 6,7 are fully compensated for by differences in intensity of such portions of the speck 15 which respectively impinge on the cells 11 and 12. Otherwise stated, and referring to FIG. 2, the combined intensity of the lower halves of the specks 5,15 equals the combined intensity of the upper halves of such specks. This means that, when the objective 9 is adjusted, exactly one-half of each of the specks 5,15 impinges upon one of the corresponding pair of cells so that the position of the objective is truly representative of the measured distance from the object despite the fact that the light intensity in all zones of the specks is not or need not be uniform. The adjustment is accurate even if the specks 5,15 include regions of widely different light intensity. This insures that the image of the object is sharply focussed on the film frame behind the objective 9.

The differential circuit 17 of FIG. 3 is a bridge circuit one branch of which includes the cells 6,11 and the other branch of which includes the cells 7,12. The circuit 17 is connected with a battery 16 or another suitable source of electrical energy and its other two branches include adjustable trimming resistors 18,19. The diagonal of the circuit 17 contains an amplifier 20 which operates a reversible electric motor 21 until the potential difference between the terminals of the amplifier 20 equals zero. The motor 21 moves the objective 9 and the cells 6,7,11,12 by means of an operative connection 22 of any known design. Such connection may include a rack and pinion drive.

The operation:

As soon as the distance between the range finder and the object changes, the specks 5,15 leave the positions shown in FIG. 2 so that their areas are not equally divided between the respective cells 6,7 and 11,12. This means that the intensity of light impinging on the cells 6,11 either exceeds or is less than the intensity of light which impinges on the cells 7,12. The circuit 17 generates a signal which is amplified at 20 and is used to operate the motor 21 which shifts the objective 9 and the cells 6,7,11,12 until the cells assume new positions in which the combined intensity of light impinging on the cells 6,11 again equals the combined intensity of light which is directed against the cells 7,12. The amplifier 20 preferably also serves as a means for selecting the direction of rotation of the motor 21. When the adjustment in the position of the objective 9 is completed, the specks 5,15 are again divided in a manner as shown in FIG. 2 so that the position of the objective 9 accurately reflects the distance from the object.

An important advantage of the improved method and apparatus is that differences in light intensity between various zones of a first beam of radiant energy (speck 5) are compensated for by equal differences in intensity between the zones of the mirror symmetrical second beam whereby the effect of differences in the second beam counteracts or balances the effect of differences in the first beam. Thus, when the range finder is adjusted, each cell of the respective pair of cells 6,7 or 11,12 is exposed to exactly one-half of the respective light beam and the amount of radiant energy to which the cells 6,11 in one branch of the circuit 17 are exposed is identical with the amount of radiant energy which reaches the cells 7,12 in the other branch. This insures accurate focussing which takes place when one-half of the speck 5 impinges on each of the cells 6,7 and one-half of the speck 15 impinges on each of the cells 11,12.

Without further analysis, the foregoing will so fully reveal the gist of the present invention that others can, by applying current knowledge, readily adapt it for various applications without omitting features which fairly constitute essential characteristics of the generic and specific asepcts of my contribution to the art and, therefore, such adaptations should and are intended to be comprehended within the meaning and range of equivalence of the claims.

What is claimed as new and desired to be protected by Letters Patent is set forth in the appended claims:

1. In an electrooptical apparatus for determining the distance between a given point and a selected portion of an object irrespective of uneven distribution of light intensity in such selected porion, a combination comprising an electric differential circuit including a first pair of photoelectric receivers which furnish identical output currents when the amount of radiant energy impinging thereon is the same and a second pair of photoelectric receivers which also furnish identical output currents when the amount of radiant energy impinging thereon is the same; first optical intercepting means for directing a first beam of radiant energy which is reflected from the selected portion of the object against said first pair of receivers; and second optical intercepting means for directing against said second pair of receivers a second beam of radiant energy which is also reflected from said selected portion of the object, said first and second beams being disposed in a first plane and said second beam being mirror symmetrical to said first beam with reference to a second plane which is normal to said first plane.

2. A combination as defined in claim 1, wherein the receivers of each of said pairs are closely adjacent to each other.

3. A combination as defined in claim 1, wherein said first pair of receivers and said first intercepting means are disposed mirror symmetrically to said second pair of receivers and said second intercepting means with reference to said second plane, said second plane extending between said first and second pairs of receivers.

4. A combination as defined in claim 1, wherein said circuit is a signal-generating bridge circuit having a first branch containing one receiver of each of said pairs and a second branch containing the other receiver of each of said pairs.

5. A combination as defined in claim 4, further comprising reversible electric motor means operative to change the distance between said receivers and said selected portion of the object in response to signals from said bridge circuit to thereby change the ratio of radiant energy which impinges on said receivers.

6. A combination as defined in claim 5, further comprising an objective lens movable by said motor means together with said receivers.

7. In a method of compensating for uneven distribution of light intensity in a selected portion of an object in electrooptical measurement of the distance between such selected portion of the object and a given point, the steps of intercepting a first beam of radiant energy which is reflected from the selected portion of the object; intercepting a second beam of radiant energy which is also reflected from the selected portion of the object and wherein the distribution of intensity is a mirror image of distribution of intensity in the first beam, said first and second beams being disposed in a first plane and said second beam being mirror symmetrical to said first beam with reference to a second plane which is normal to said first plane; and simultaneously evaluating both such beams for electrooptical measurement of the distance between the selected portion of the object and the given point, including directing the first beam against a pair of first photoelectric receivers which furnish identical output currents when the amount of radiant energy impinging thereon is the same and directing the second light beam against a pair of second photoelectric receivers which also furnish identical output currents when the amount of radiant energy impinging thereon is the same, said second receivers being in a differential electric circuit with the first receivers.

8. In a method as defined in claim 7, wherein said first photoelectric receivers are photoelectric resistors which are closely adjacent to each other.

9. In a method as defined in claim 7, wherein said second photoelectric receivers are photoelectric resistors which are closely adjacent to each other.

10. In a method as defined in claim 7, wherein each of said beams produces on the respective receivers a circular speck of light.

\* \* \* \* \*